Oct. 17, 1967 E. H. ALLEN 3,347,004

CLEAR VIEW SCREENS

Filed Aug. 13, 1965

INVENTOR
Eric H. Allen
BY
Baldwin & Wight
ATTORNEYS 3,347,004
CLEAR VIEW SCREENS
Eric H. Allen, Stopsley, Luton, England, assignor to George Kent Limited
Filed Aug. 13, 1965, Ser. No. 479,501
Claims priority, application Great Britain, Sept. 14, 1964, 37,477/64
16 Claims. (Cl. 52—171)

ABSTRACT OF THE DISCLOSURE

This invention is directed to a clear view screen so constructed as to be readily secured to and removed from an unapertured window panel. The screen includes an outer frame carrying a centrally located hub in which is rotatably journalled a shaft carrying a transparent disc. The shaft is driven to rotate the disc causing rain or other moisture to be spread by centrifugal force so as to provide clear vision through the rotating disc. The hub is in non-rotatable contacting thrust engagement with a surface of the unapertured window panel.

Figures 1, 2:
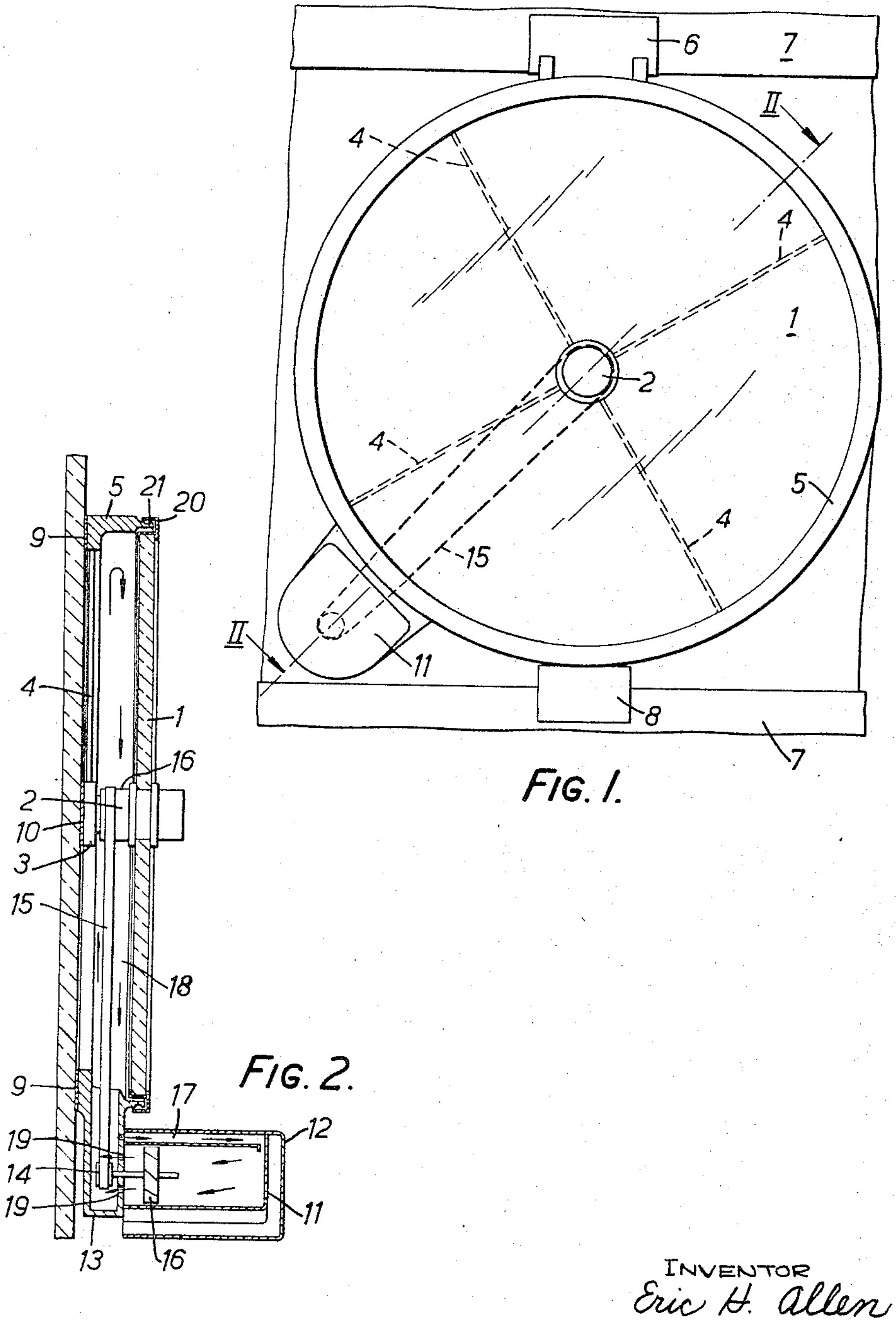

This invention relates to clear view screens of the kind comprising a disc which is rotated at high speed so that moisture, for example rain, is spread by centrifugal force over its surface as a thin film and is then flung off so as to provide clear vision through the rotating disc. Such screens are used in a variety of applications for example on ships, road or rail vehicles and some types of aircraft.

In one type of construction so far used it has been the practice to mount the disc on a bearing which is supported on an arm of sufficient section to support the disc under the action of, for example, wind forces. This arm, along which is usually taken the drive for rotating the disc, forms part of the framework of the screen which is then mounted in a large aperture cut in the window panel in which the screen is fitted. With this arrangement the arm causes a considerable reduction in the area of the vision for a given size disc.

In another form of construction which is at present in use, a small hole is cut in the window panel and is used to support the driving motor so as to dispense with the need for a heavy section support arm. The rotatable disc is then fitted to the motor spindle on the outside of the window panel in such a way that a double glazing arrangement is obtained. With this arrangement it is necessary to restrict the size of motor otherwise vision in the region of the centre of the rotating disc is obscured. It is also usually necessary to provide some form of heating element in the cavity between the window panel and the rotating disc in order to eliminate condensation.

A disadvantage with both types of construction referred to above is that holes have to be cut in the window panel and if the panel is broken the cost of replacing the clear view screen is often high.

According to the present invention a clear view screen for attachment to a window panel comprises an outer frame carrying a bearing which supports a rotatable disc, the frame being adapted to engage the surface of the window panel with which it is to be used, and including means for securing the frame in position.

It will be appreciated that such a clear view screen can be attached to a window panel which is flat or curved and it is not necessary to cut holes in the panel itself.

Preferably the bearing is carried in a hub supported in the centre of the frame by two or more supports, the widths of which are so small as compared with the area swept by the rotatable disc, that vision through the screen is not impaired, and preferably the hub is adapted to engage the window panel when the frame is in position so that the disc assembly becomes rigid. To achieve this the hub may carry a thrust pad which can bear against the window panel.

The edge of the frame which engages the window panel may carry a resilient member which can seal the frame to the panel and the means for securing the frame in position are preferably releasable so that the frame can be easily removed and reattached.

Conveniently the means for securing the frame in position may include a hinge so that the frame can be swung away from the window panel to facilitate cleaning and maintenance and the frame securing means may be adapted for connection to the frame of the window panel with which the screen is to be used.

Preferably the screen includes means for rotating the disc, for example an electric hydraulic or pneumatic motor and this motor may be carried by the outer frame driving the disc through driving means extending from the frame to the hub.

The driving means preferably extend to the hub on the side of the disc adjacent the window panel and thus the disc may be displaced away from the edge of the frame which is adapted to engage the window panel to provide a cavity between the disc and the panel when the screen is in position, the cavity being bounded by the outer frame.

With this arrangement means may be included for circulating heated air in the cavity and according to one feature of the invention the motor is electrically operated and is arranged to heat the air circulating in the cavity.

The invention also includes a clear view screen as set forth in combination with a window panel.

The invention may be performed in various ways but one embodiment will now be described by way of example and with reference to the accompanying drawings in which:

FIGURE 1 is a front elevation of a clear view screen according to the invention, and, FIGURE 2 is a part sectional end elevation of the screen shown in FIGURE 1 on the line II—II.

In the arrangement to be described a rotatable disc 1 is mounted on a spindle 2 which runs in a bearing contained in a hub 3 adapted to non-rotatably contactingly engage a surface of a window panel preferably through an intermediate thrust pad, as will appear more fully hereafter. This non-rotatable hub 3 is supported by pre-tensioned radial ties 4 which are anchored to an outer frame 5. The ties 4 are of small cross-section and can be in the form of solid or hollow rods of for example wire, and any convenient number of ties may be used provided the hub 3 is accurately and rigidly located. The outer frame 5 is in the form of an annular ring which is supported by a hinge 6 which can be mounted on the frame 7 of the window with which the clear view screen is to be used. This frame 7 also carries a catch arrangement 8 for co-operation with a point on the diametrically opposite side of the outer ring 5 from the hinge 6 so that the screen can be clamped against the window. The outer ring 5 is fitted with a rubber sealing ring 9 on its edge which engages the window panel and this bears against the outer surface of the panel when the screen is in the clamped position. Irregularities in the surface of the window can be accommodated by the seal and in versions which are required to be fitted to curve window panels the back face of the outer ring 5 is shaped accordingly or curvature could be accommodated by the sealing ring 9 itself. When the screen assembly is clamped against the window panel a thrust pad 10 which is mounted on the end of the bearing hub 3 bears against the window panel so that the disc assembly becomes rigid. The radial ties 4 are positioned so that in the unclamped position the thrust pad 10 protrudes through a plane taken across the surface of the seal 9 so that on clamping the screen against the window, the hub 3 and pad 10 are displaced slightly to provide the necessary rigid support. A radial support for the hub and disc assembly is given by the tie rods 4 in tension and longitudinal support against thrust etc., is given by the window panel itself.

An electric motor 11 is mounted in a water-proof housing 12 on the outside of the screen assembly on a hollow mounting 13 on the outer ring and this motor carries a pulley 14 which operates a belt 15 which can drive a pulley 16 on the spindle 2. Incorporated in the weatherproof housing of the motor is a duct 17 which connects the cavity 18 between the window panel and the disc 1 to the rear end of the motor housing. The front end of the motor housing communicates with this cavity directly through holes 19 which lead into the hollow mounting 13 and the rotor of the motor is shaped so that it continuously circulates the air from the cavity 17 through the motor the direction of air circulation being indicated by the arrows. There is normally sufficient heat dissipated in the motor winding to maintain the circulating air at a temperature which will prevent condensation occurring in the cavity. It will be appreciated that a similar arrangement can be arranged if a pneumatic or hydraulic motor is utilized but in this case there will be no heat dissipated by the motor so that a small heater will be necessary which can be arranged at a suitable position, for example, in the circulating duct 17.

In any case in applications where ice is likely to form it has been found necessary to mount a heater within the cavity 18 itself. Such a heater can be in the form of a circular element, coil or strip mounted around the inside edge of the outer ring 5.

The outer peripheral edge of the disc 1 carries a bezel 20 which is intended to prevent the direct ingress of moisture through the annular space between the disc 1 and the outer ring 5. This bezel 20 overlaps the edge of the outer ring 5 which is displaced from the window panel but any moisture that does pass the outer edge of the bezel collects in a circumferential drainage gutter formed by the groove 21 in the outer ring and drains to a point at the bottom of the screen from which it is drained by any suitable means. It will be appreciated that this circumferential drainage gutter is covered by the bezel 20 on the disc 1.

If required an isolating switch (not shown) can be incorporated in the electric motor circuit which acts to cut off the power to the motor 11 before the screen can be hinged away from the window panel. When installing the clear view screen the tie rods 4 which form the supports for the hub 3 can be arranged so that they are not vertical or horizontal and will not therefore form obstructions to normal vision.

The invention provides a clear view screen with the minimum obscurity of vision through the window panel due to the small size of the supports for the hub which can be mounted on new or existing window panels without the need for cutting or drilling. This point is of particular advantage in as much that the panel is not weakened due to the drilling or cutting. Thus the invention can be applied to window panels which are glazed with glass containing heating elements. This type of glass is usually manufactured in the form of a sandwich containing a very thin oxide film through which current is circulated to heat the panel. With this type of window it is essential that the glass is not cut or drilled in any way whatsoever. The screen forms a double glazing arrangement which improves winter vision and also eliminates draughts and the ingress of contaminated atmospheres to the chamber or cabin to which it is fitted. It also tends to reduce noise therein.

The screen can be quickly and easily swung away from the window for cleaning purposes and can also be completely removed for servicing whilst still leaving the window panel intact.

When an electric motor is used the warm air therefrom can conveniently be used to provide screen demisting and the screen can be easily be adapted to fit curved window panels by making the outer ring 5 of an appropriate shape or using a sufficiently resilient sealing ring 9, moreover the screen is suitable for use on windows of pressurised cabins which has not previously been the case with vision screens of this kind.

What we claim is:

1. A clear view screen in combination with an unapertured window panel comprising an outer frame, means fixedly supporting hub means within said outer frame, means carried by said hub means for rotatably mounting a disc relative thereto, said hub means being in non-rotatable contacting engagement with a surface of the unapertured window panel to which the screen is attached, and means for securing the frame in position relative to the window panel surface.

2. The clear view screen in combination with an unapertured window panel as defined in claim 1 wherein the hub means is supported in the center of the frame by at least two supports, and each of said supports has a width which is relatively small as compared with the area of said disc.

3. The clear view screen in combination with an unapertured window panel as defined in claim 1 wherein said hub means includes yieldable pad means at an end portion thereof in bearing engagement against the window panel surface.

4. The clear view screen in combination with an unapertured window panel as defined in claim 1 wherein said hub means includes yieldable pad means at an end portion thereof in bearing engagement against the window panel surface, said frame includes an edge also in contact with the window panel surface, and said hub means prior to the frame being secured in position projects beyond a plane taken through said frame surface whereby when the screen is secured in position a surface of the yieldable pad means is displaced.

5. The clear view screen in combination with an unapertured window panel as defined in claim 1 wherein said frame includes a surface engaging the window panel surface, and said frame surface includes a resilient member sealing the frame to the window panel surface.

6. The clear view screen in combination with an unapertured window panel as defined in claim 1 wherein said securing means are releasable whereby the frame can be readily attached to or removed from the associated window panel.

7. The clear view screen in combination with an unapertured window panel as defined in claim 1 wherein said securing means include hinge means for swinging the frame away from the window panel.

8. The clear view screen in combination with an unapertured window panel as defined in claim 1 wherein said frame includes axially opposite edges, a periphery of said disc being disposed adjacent one of said edges whereby said frame and disc define a cavity, and means for circulating heated air in said cavity.

9. The clear view screen in combination with an unapertured window panel as defined in claim 1 wherein said frame includes axially opposite edges, said disc includes a periphery adjacent one of said frame edges whereby said frame and disc define a cavity, means for heating air and introducing air into said cavity, and said heating means being an electrical motor.

10. The clear view screen in combination with an unapertured window panel as defined in claim 1 wherein said frame includes axially opposite edges, a periphery of said disc being disposed adjacent one of said edges, and heater element means extending about the other of said edges.

11. The clear view screen in combination with an unapertured window panel as defined in claim 1 including means to prevent the ingress of moisture into said frame through an annular gap between the disc and the frame.

12. The clear view screen in combination with an unapertured window panel as defined in claim 1 including means for preventing the ingress of moisture through an annular gap between the disc and the frame, said last-mentioned means including a bezel carried by the disc which overlaps an adjacent edge of the frame.

13. The clear view screen in combination with an unapertured window panel as defined in claim 1 including means for preventing the ingress of moisture through an annular gap between the disc and the outer frame, said last-mentioned means including a bezel carried by the disc in overlapping engagement with an adjacent edge of the frame, and the adjacent edge of said frame being provided with a circumferential drainage gutter disposed within and covered by said bezel.

14. The clear view screen in combination with an unapertured window panel as defined in claim 1 wherein said hub means includes an end portion remote from said disc, said hub means and said frame having surfaces in contact with the window panel surface, and said frame and hub surfaces being disposed in a generally common plane.

15. The clear view screen in combination with an unapertured window panel as defined in claim 1 wherein said frame includes axially opposite edge portions, said disc having a periphery disposed adjacent one of said edge portions thereby defining a cavity with said frame, means for driving said rotatable mounting means for rotating said disc, said driving means including an electric motor, a housing for said motor, means for introducing air from said cavity into said housing, and means for introducing air from said housing to said cavity.

16. A clear view screen in combination with an unapertured window panel comprising an outer frame, means fixedly supporting hub means within said outer frame, means carried by said hub means for rotatably mounting a disc relative thereto, said hub means being in non-rotatable contacting engagement with a surface of the unapertured window panel to which the screen is attached, means for securing the frame in position relative to the window panel surface, said hub means being supported in the center of the frame by at least two supports, each of said supports having a width which is relatively small as compared with the area of said disc, said hub means including yieldable pad means at an end portion thereof in bearing engagement against the window panel surface, said frame including an edge also in contact with the window panel surface, said hub means prior to the frame means being secured in position projects beyond a plane taken through said frame surface, whereby when the screen is secured in position a surface of the yieldable pad means is displaced, said frame surface includes a resilient member for sealing the frame to the window panel, said securing means being releasable whereby the frame can be readily attached to or removed from the associated window panel, and said securing means includes hinge means for swinging the frame away from the window panel.

References Cited

UNITED STATES PATENTS

| | | | |
|---|---|---|---|
| 1,388,214 | 3/1921 | Tate | 52—171 |
| 1,508,761 | 9/1924 | De Normanville | 52—171 |
| 1,649,850 | 11/1927 | Olsen | 52—171 |

FOREIGN PATENTS

| | | |
|---|---|---|
| 870,794 | 1955 | France. |
| 114,338 | 1918 | Great Britain. |
| 739,794 | 1955 | Great Britain. |
| 758,097 | 1956 | Great Britain. |
| 900,916 | 7/1962 | Great Britain. |

KENNETH DOWNEY, *Primary Examiner.*